Figure 1:
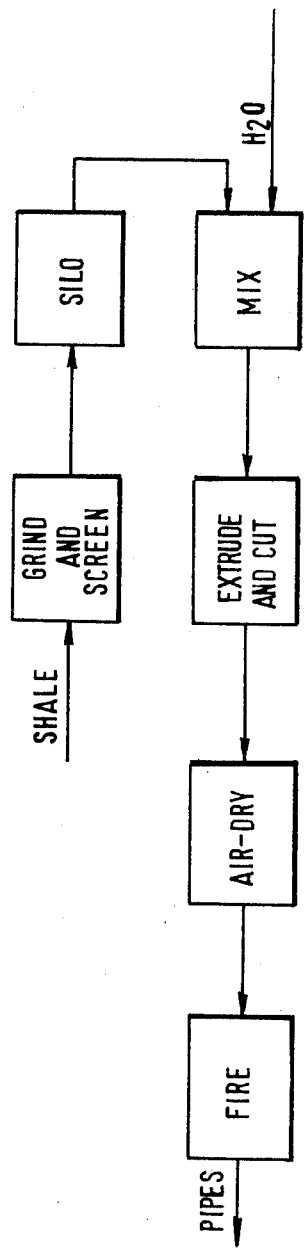

United States Patent [19]

Booth

[11] 4,264,301
[45] Apr. 28, 1981

[54] METHOD AND APPARATUS FOR FIRING CERAMIC PRODUCTS

[75] Inventor: John F. Booth, Sheffield, England

[73] Assignee: The Hepworth Iron Company Limited, Sheffield, England

[21] Appl. No.: 42,615

[22] Filed: May 25, 1979

[30] Foreign Application Priority Data

May 26, 1978 [GB] United Kingdom ............... 23046/78

[51] Int. Cl.³ .............................................. F27B 9/14
[52] U.S. Cl. .................................. 432/124; 198/416; 198/693
[58] Field of Search ................. 432/122, 124, 126; 198/384, 416, 483, 688, 693, 698, 699

[56] References Cited

U.S. PATENT DOCUMENTS

| | | | |
|---|---|---|---|
| 1,777,361 | 10/1930 | Gottschalk | 198/399 |
| 2,612,706 | 10/1952 | Simpson et al. | 432/124 |
| 2,788,113 | 4/1957 | Waal | 198/384 |
| 2,838,297 | 6/1958 | Shappell | 432/124 |
| 2,872,175 | 2/1959 | Guenzl | |
| 4,142,304 | 3/1979 | Ricci et al. | 432/124 |

FOREIGN PATENT DOCUMENTS 2314117  1/1977  France .
 932686  7/1963  United Kingdom .
1468407  3/1977  United Kingdom .

*Primary Examiner*—John J. Camby
*Attorney, Agent, or Firm*—Toren, McGeady & Stanger

[57] ABSTRACT

Clay pipes and the like (3) are fired in a kiln (1) through which they are conveyed by a pusher conveyer (2, 4) as individual articles, instead of being carried on cars or in containers. In the main firing zone of the kiln the pipes (3) roll along a surface (6) to maintain roundness and ensure uniform heating. In the preheating zone of the kiln the pipes are carried by carriers (5) of the conveyer without rotating. The pipes may also be carried without rotating in the final cooling zone of the kiln.

9 Claims, 3 Drawing Figures

METHOD AND APPARATUS FOR FIRING CERAMIC PRODUCTS

This invention relates to the manufacture of ceramic products. It has particular but not exclusive application to the manufacture of clay pipes, for use e.g. as drainage or sewer pipes, cable ducts, and the like.

At present, clay pipes are commonly manufactured by a process including firing of groups of pipes standing on carriers which move through a tunnel kiln, involving high energy costs because the carriers absorb heat which is wasted, and undesirable handling because the pipes have to be placed on the carriers, which usually involves turning the pipes from a horizontal to a vertical orientation, so that they maintain a circular cross section while being fired.

It has been suggested that ceramic tubes be rolled horizontally during firing inside rolling containers, but such containers absorb and therefore waste heat, and placing the green ceramic tubes in the containers involves an undesirable amount of handling and risk of damage to the tubes.

It is an object of the present invention to provide a method and apparatus for firing cylindrical ceramic articles e.g. pipes, in particular clay pipes, enabling the articles to be fired economically while ensuring that roundness is maintained.

According to one aspect of the present invention, there is provided a method of making cylindrical ceramic articles, in which the articles are fired in a kiln through which the articles travel individually, the articles being transported through the kiln by conveying means having members which separate and control the translation of individual articles, said members moving along the kiln, and in which, over at least that part of the length of the kiln in which the articles are at their greatest temperature, the articles roll on a surface of the kiln.

According to another aspect of the invention there is provided a kiln for firing cylindrical ceramic articles comprising a tunnel provided with firing means; means for conveying the articles individually through the kiln, which conveying means comprise conveying members arranged to separate and control the translation of the individual articles along the kiln, and driving means for moving the conveying members along the kiln; and a surface extending along at least that part of the kiln of greatest operating temperature and disposed in the path of the articles whereby the articles travelling through the kiln will roll on the said surface.

The use of such a roller kiln simplifies handling and facilitates automation of the firing process, and the rolling of the articles ensures even heating and maintains roundness despite the plasticity of the articles during firing.

Individual or single-piece transportation through the kiln involves less handling and less heat input compared with transportation of the articles in groups on carriers as is conventional, or in containers. The invention therefore provides a manufacturing process and apparatus of great simplicity and economy, capable of being operated substantially automatically. The roller kiln can be relatively short compared with conventional tunnel kilns, thereby reducing the capital cost of the plant as well as the energy cost of operation.

Figure 2:
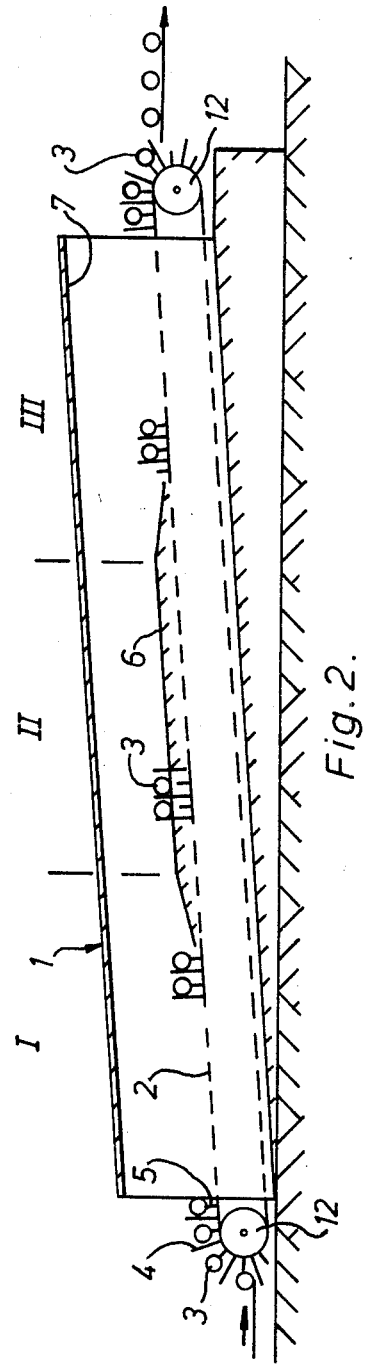

The present invention will be further described with reference to the accompanying drawings, in which:

FIG. 1 is a block diagram of a process for the manufacture of clay pipes,

FIG. 2 schematically shows the kiln used for firing the pipe, and

Figure 3:
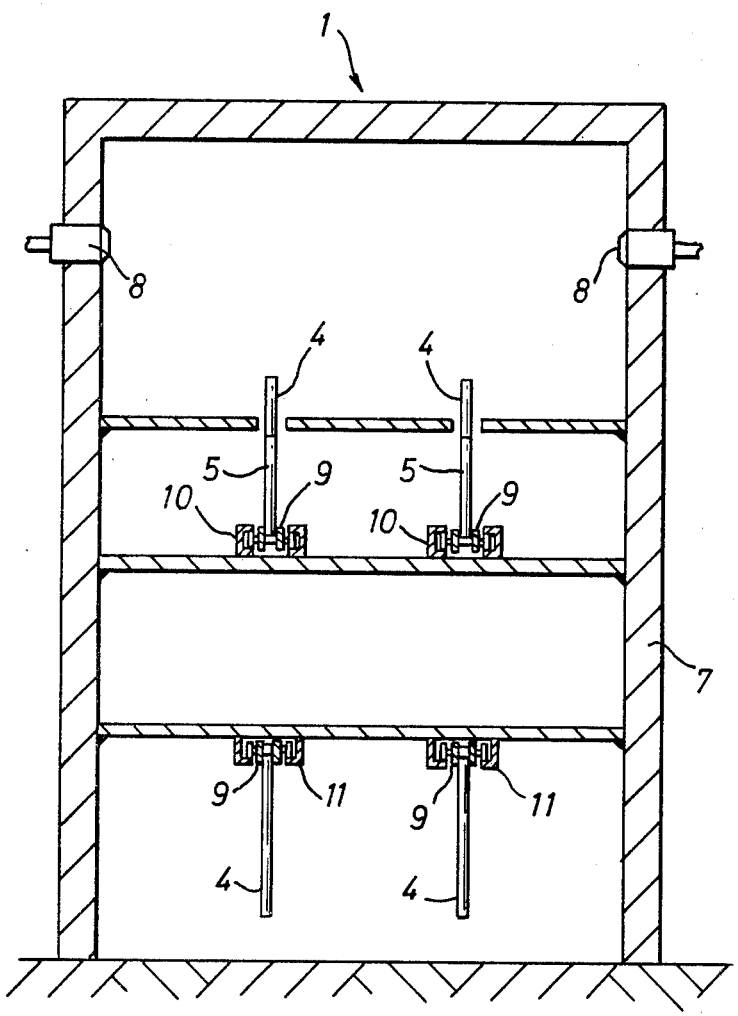

FIG. 3 shows a schematic cross section of the main firing zone of the kiln.

In the process illustrated in FIG. 1 the raw material, for example shale, which may be previously blended to a desired composition, is ground and screened to a desired particle size. The ground material is then, if necessary, stored in a silo.

The ground material is mixed with water and then extruded in a conventional pipe extrusion machine, the extruded green pipe being cut into desired lengths. The cut lengths are then dried, for example in an air dryer, and immediately after drying are fired.

The extrusion, cutting, drying and firing are all performed with the pipes horizontal, thereby eliminating any need to turn the pipes and minimising handling. In particular the handling involved in stacking pipes on kiln cars in conventional tunnel kiln firing is eliminated as will be clear from the ensuring description. The preparation treatment to which the clay is subjected depends on the nature of the clay, but in one possible arragement, selected and blended shales are ground in a grinder, the resulting ground material is held in storage silos if necessary, and is pneumatically conveyed to a water mixing machine, from which it is fed to a pipe extrusion machine.

The clay is extruded horizontally from the latter in conventional manner and the extruded piping is cut by a cutter into pipe lengths. These are conveyed by way of a trimmer to an air drier through which they are conveyed, the individual pipe lengths being horizontal and parallel to each other and moving in a direction perpendicular to their lengths through the drier.

After emerging from the drier, the dried pipe lengths are transferred by an index conveyor to a conveying means 2 by which they are conveyed individually through a kiln 1 in which they are fired.

The kiln 1 is shown schematically in FIGS. 2 and 3, and consists of a tunnel 7 with a refractory lining, provided with burners 8 or other firing means, exhaust gas extraction ducts, and inlets for dilution air and for cooling air, arranged to give a desired temperature profile along the length of the kiln.

The conveying means 2 runs through the tunnel. The tunnel and conveying means slope gently upwards, for example at about 3°, but this slope is not essential.

The conveying means may be horizontal or may slope downwards. In the latter case the pipes roll under gravity and are restrained and separated by preceding members of the conveying means, whereas if the conveying means is horizontal or slopes upwards the pipes are pushed by the conveying means. In any case it is important to prevent contact between adjacent pipes, to avoid damaging the pipes, and to maintain contact between the pipes and the pushing or restraining members of the conveying means because if such contact is lost and subsequently regained the pipes may be damaged by impact with the said members; a downwardly sloping conveyer would therefore have to be steep enough to ensure that the pipes cannot lag behind the restraining members of the conveying means. The conveying means delivers them for example to a loading platform.

In the illustrated kiln in which the conveying means 2 slope upwards, the conveying means has pushers 4 of refractory material alternating with carriers 5 of refractory material. The carriers are substantially lower than the pushers. The carriers 5 and pushers 4 are moved continuously through the kiln whereby the pipe lengths 3 are transported through the kiln, individually and separated by the pushers 4. The conveying means are designed to keep the pipe lengths perpendicular to the direction of movement; this can be achieved by providing a series of pushers 4 and carriers 5 at each side of the kiln as shown in FIG. 3, and moving them in synchronism.

Conveniently, the pushers 4 and carriers 5 are carried by a pair of endless conveyer chains 9 which recirculate in the kiln structure to conserve heat, fixed guides 10, 11 being provided for the chains and chain wheels 12 being provided at the kiln ends. The chains may be driven by means of the chain wheels 12 or by additional drive sprockets.

The conveying means have no tendency to rotate the pipe lengths.

The kiln is divided into three zones, namely a preheating zone I, a main firing zone II, and a cooling zone III. In the first and third zones the pipe lengths are carried by the carriers 5 and separated by the pushers 4. However, in the intermediate main firing zone II, a fixed ramp 6 is provided the upper surface of which is slightly higher than the upper ends of the carriers 5, so that the ramp lifts the pipe lengths 3 off the carriers 5 and the pipe lengths are pushed along the ramp by the pushers 4, and roll on the ramp surface. This rolling ensures that the pipe lengths are uniformly heated and remain perfectly round in cross section although they will normally become plastic at the firing temperatures used in the zone II.

The rolling surface of the ramp 6 is wide enough to support the pipe lengths so that they do not sag, when plastic, at their ends or at an intermediate region. The surface may have a width comparable to or greater than the pipe lengths, if the latter have plain ends. If the pipe lengths have bell ends, the bell ends must overhang the rolling surface which therefore must be spaced from the inner side wall of the kiln at at least one side. The ramp 6 may have transition regions at its ends to provide a gentle transition of the pipe lengths from the non-rolling condition to rolling, and vice versa. As shown in FIG. 3, the ramp surface extends outside and between the two series of pushers 4 and carriers 5, slots being provided in the surface to accommodate the projecting pushers 4. Suitable thermal protection for the chains is provided.

Because the pipe lengths are carried without rolling in the preheating zone I, in which they are relatively weak, any risk of damage that might be caused by rolling in this zone is eliminated. Furthermore, a rolling pipe length may tend to drift in its axial direction because of inevitable departures from a perfect cylindrical form and imperfections in the conveying means and ramp. This drift might lead to damage at the pipe ends due to contact with the kiln walls or to measures taken to correct the drift. By allowing the pipe lengths to roll only in the main firing zone II where they are plastic, such drift can be kept down to acceptable amounts without special measures to guide the pipe ends or to push the pipe lengths back into a central position.

The pipe lengths are fired as individual single pieces, and are not conveyed on kiln cars or by any other carrier. Consequently the heat which in a conventional tunnel kiln is used to heat kiln cars, and is lost, is saved in the roller kiln of this invention. This saving reduces the amount of energy and the time needed to fire the pipes. The efficient heating due to the rolling also promotes firing. The conveying means absorb heat but in a much smaller amount than kiln cars, and by the use of recirculating conveying means energy losses can be reduced. The kiln can therefore be made relatively short, thus reducing capital cost as well as energy cost. As already mentioned, the rolling of the pipe lengths ensures roundness, and can also improve the surface finish. The conveying of the pipes individually instead of in groups on carriers eliminates loading and unloading operations, especially if the pipe lengths are always horizontal, so that the plant can operate substantially entirely automatically.

Preferably, in the main firing zone II, the burners 8 or other heating means are disposed above the path of the pipe lengths, since such an arrangment provides the greatest uniformity of temperature. In the pre-heating zone I, it may be more advantageous to place the heating means below or substantially level with the pipe lengths, for example to direct heat along the interiors of the latter, in order to obtain rapid heating and thereby reduce the length of the kiln. The cooling zone II is provided with inlets for blown cooling air.

The clay preparation, and the operating parameters of the kiln, will depend on the nature of the raw material and on the dimensions of the pipes being produced.

The conveying means can be of any convenient form. The pushers and carriers may be separate, or a conveying member may comprise a pusher region and a lower carrier region. Successive members of the conveying means may be interconnected e.g. on a chain or may be separate, for example being pushed through the kiln in a series.

Separate conveying means, not necessarily of the same kind, may be provided in the rolling and nonrolling zones respectively, especially if the kiln is long.

Clay pipes produced by the described method and apparatus have a dense and uniform structure, a fine surface finish and excellent dimensional tolerances.

I claim:

1. A kiln for firing cylindrical ceramic articles comprising a tunnel provided with firing means; means for conveying the articles individually through the kiln, which conveying means comprise conveying members arranged to separate and control the translation of the individual articles along the kiln, carrying members for carrying the individual articles during translation thereof, and driving means for moving the conveying members and carrying members along the kiln; and a surface extending along a portion of the length of the kiln comprising at least that part of the kiln of greatest operating temperature and disposed in the path of the articles at a level higher than the carrying members whereby in said portion of said kiln the articles travelling through the kiln will roll on the surface and in a further portion of said kiln said articles are carried by said carrying members without rolling.

2. A kiln as claimed in claim 1 in which the conveying means has individual carriers for carrying the articles, disposed between successive article separating members.

3. A kiln as claimed in claim 2 in which the kiln has a first region provided with means for preheating the articles, said region being followed by a firing region provided with heating means for firing the articles, and the said rolling surface is disposed substantially only in the firing region, whereby in the preheating region the articles will be carried by the carriers.

4. A kiln as claimed in claim 1, in which the kiln has a firing region provided with heating means above the path of the articles.

5. A kiln as claimed in claim 1 in which the said surface extends over at least a substantial portion of the width of the kiln.

6. A kiln as claimed in claim 1 having said members disposed in two series spaced apart across the kiln.

7. A kiln as claimed in claim 1 in which the conveying means define a conveying path which is horizontal or slopes upwardly along the kiln.

8. Plant for making ceramic pipes comprising apparatus for forming ceramic material into green pipe lengths; a drier, a kiln comprising a tunnel provided with firing means; means for conveying the articles individually through the kiln, which conveying means comprise conveying members arranged to separate and control the translation of the individual articles along the kiln, carrying members for carrying the individual articles during translation thereof, and driving means for moving the conveying members and carrying members along the kiln; and a surface extending along a portion of the length of the kiln comprising at least that part of the kiln of greatest operating temperature and disposed in the path of the articles at a level higher than the carrying members whereby in said portion of said kiln the articles travelling through the kiln will roll on the surface; and in a further portion of said kiln said articles are carried by said carrying members without rolling and conveying means arranged to transport the pipe lengths from the forming apparatus to the drier and from the drier to the kiln.

9. Plant as claimed in claim 8 in which the forming apparatus, dryer, kiln and conveying means are so disposed that the pipe lengths are formed in and remain in a horizontal orientation.

* * * * *